Patented Nov. 28, 1922.

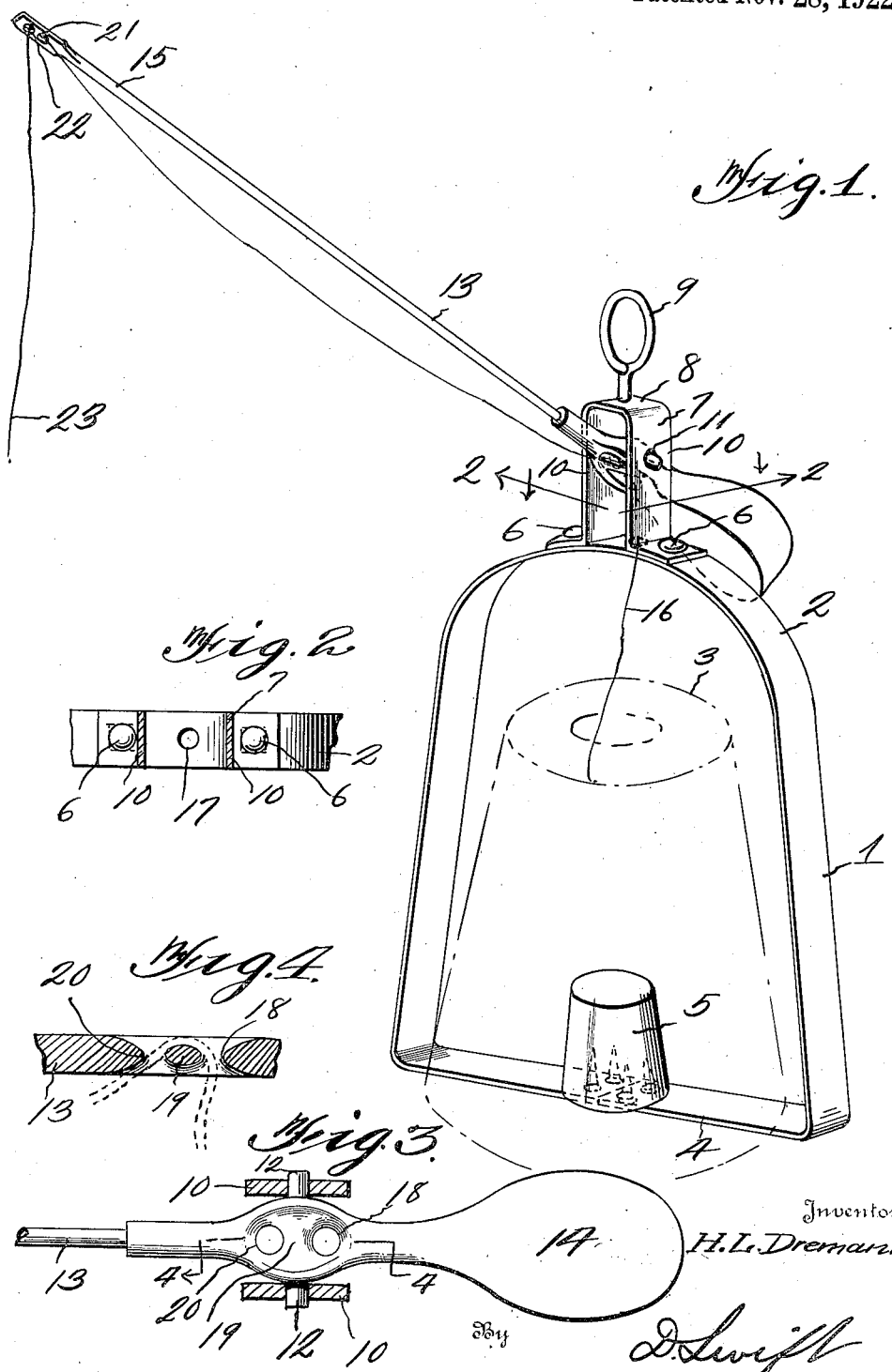

1,437,295

UNITED STATES PATENT OFFICE.

HENRY L. DREMANN, OF QUINCY, ILLINOIS.

TWINE HOLDER.

Application filed December 21, 1921. Serial No. 523,881.

*To all whom it may concern:*

Be it known that I, HENRY L. DREMANN, a citizen of the United States, residing at Quincy, in the county of Adams, State of Illinois, have invented a new and useful Twine Holder; and I do hereby declare the following to be a full, clear, and exact description of the invention, such as will enable others skilled in the art to which it appertains to make and use the same.

The invention relates to twine holders of a type designed to be disposed above a wrapping counter and provided with a weighted pivoted arm, through eyes of which the twine passes, said weighted arm normally being maintained in upper positions by its weight and consequently holding the free end of the cord above the wrapping counter. Also to provide the pivoted arm with pintles, disposed within bearings of a U-shaped member carried by the twine holder, and to provide a guide opening in the twine holder through which guide opening twine passes and is passed through spaced apertures carried by the weighted member on each side of the pintles.

A further object is to provide spaced apertures adjacent the free end of the weighted member and through which apertures the twine passes so that its free end will hang downwardly where it can be easily reached by an operator and the weight arm tilted downwardly against the action of its weight to a position where the twine will easily feed through the spaced apertures.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of a twine holder.

Figure 2 is a horizontal sectional view through the arm supporting member taken on line 2—2 of Figure 1.

Figure 3 is a top plan view of the weighted arm showing the spaced twine receiving apertures.

Figure 4 is a detail sectional view through a portion of the weighted arm and taken on line 4—4 of Figure 3.

Referring to the drawings, the numeral 1 designates a metallic frame, the upper arched portion 2 of which arches the ball of cord 3, and the lower transversely disposed portion 4 has secured thereon a cord receiving cone 5, which supports the ball of twine 3. Secured to the arched portion 2 of the frame 1 by means of rivets 6 is a U-shaped bracket 7 in the transverse portion 8 of which a supporting eye 9 is secured. The eye 9 is adapted to receive a supporting cord whereby the device as a whole may be suspended above a wrapping counter or the like. Pivotally mounted in bearings 11 of the arms 10 of the U-shaped member 7 are pintles 12 of the weighted arm 13. The arm 13 adjacent the pintles 12 is provided with a weight 14 which normally maintains the end 15 of the weighted arm 13 in raised position as shown in Figure 1. The twine 16 extends upwardly through a guide aperture 17 disposed in the arched portion 2 of the frame and in the same vertical plane as the pintles 12, then passes upwardly through the aperture 18 located rearwardly of the pintle and thence over the portion 19 and downwardly through the aperture 20 forwardly of the pintles 12. The cord after it leaves the aperture 20 extends forwardly under the arm 13 and then passes upwardly through an aperture 21 adjacent the end of the arm and then downwardly through the aperture 22 and has its free end 23 disposed above a wrapping counter. When the operator desires to use the cord, he reaches upwardly grasps the free end 23 and pulls downwardly on the same, which action will rock the weighted arm 13 to a position where the cord will easily move through the apertures 18 and 20 and the apertures 22 and 21 and will feed to the operator during a bundle wrapping operation. After a bundle wrapping operation, the cord tied, broken and then released, the free end will be raised clear of the wrapping counter by the weighted arm 13, thereby positioning the free end where it will not interfere with the preparation for wrapping the next bundle.

From the above it will be seen that twine holding and feed means therefore is provided, which is simple in construction and one wherein the twine feeds through spaced apertures in a weighted arm in such a manner that when the arm is pivoted downwardly the twine will easily feed through the apertures and when the twine is released the free end will be raised by the upward movement of the free end of the weighted lever.

The invention having been set forth what is claimed as new and useful is:—

1. A twine holder comprising a frame, means for supporting a roll of twine on said frame, said frame arching the roll of twine, a U-shaped bracket having its arms extending downwardly and secured to the arched portion of the frame and having its transverse portion spaced above the upper end of the frame, means carried by said transversely disposed portion of the U-shaped bracket whereby the frame as a whole may be supported spaced from a desk, an arm pivoted in the U-shaped bracket by means of integral pintles mounted in bearings of the opposite arms of the bracket, the pivoted arm being provided with a weight at one of its ends, the other end of the pivoted arm being remotely disposed in relation to the pivotal point of the arm, said arm adjacent its pivotal point being provided with spaced apertures, one on each side of the pivotal point for the reception of the free end of the cord after the same has been passed through an aperture in the arched portion of the frame, the outer end of the pivoted arm being provided with spaced apertures through which the free end of the cord passes and feeds.

2. The combination with a twine holder frame having a roll of twine thereon, of an arm pivoted above said frame and having a long and a short arm, a weight carried by said short arm, the arm on each side of its pivotal point being provided with spaced apertures for the reception of the free end of the twine, the outer end of the long arm of the pivoted arm being provided with spaced apertures through which the free end of the twine passes and feeds.

In testimony whereof I have signed my name to this specification in the presence of two subscribing witnesses.

HENRY L. DREMANN.

Witnesses:
 GERHARD J. SANDER,
 CARL H. STOLLMER.